United States Patent [19]
Anderson et al.

[11] Patent Number: 5,548,274
[45] Date of Patent: Aug. 20, 1996

[54] STROBE LIGHT FOR A VEHICLE TIRE AND WHEEL

[76] Inventors: Kent G. Anderson, 925 N. Griffin, Bismarck, N. Dak. 58501; Robert R. Reed, 104 Sweetbriar Rd., Greenville, S.C. 29615

[21] Appl. No.: 504,446

[22] Filed: Jul. 20, 1995

[51] Int. Cl.$^6$ ................................................. B60Q 1/26
[52] U.S. Cl. .................. 340/468; 340/463; 340/425.5; 356/23; 362/78; 152/523
[58] Field of Search ........................... 340/468, 463, 340/425.5; 152/523; 354/524, 522; 324/76.39, 76.77; 315/241 S; 356/23; 362/78

[56] References Cited

U.S. PATENT DOCUMENTS

| | | | |
|---|---|---|---|
| 3,675,199 | 7/1972 | Jamison | 340/425.5 |
| 3,763,366 | 10/1973 | Bahnsen | 362/16 |
| 3,946,782 | 3/1976 | Petrasek | 359/524 |
| 4,023,888 | 5/1977 | Klaenhammer | 359/522 |
| 4,225,227 | 9/1980 | Baba | 356/23 |
| 4,241,337 | 12/1980 | Prada | 340/547 |
| 4,289,376 | 9/1981 | Vukadinovic | 350/99 |
| 4,318,436 | 3/1982 | Shurman | 152/353 R |
| 4,430,692 | 2/1984 | Papadakis | 362/32 |
| 4,645,299 | 2/1987 | Seitz | 359/524 |
| 4,655,546 | 4/1987 | Nagasaka | 359/524 |
| 4,775,919 | 11/1988 | Pearsall | 362/78 |
| 4,881,153 | 11/1989 | Scott | 362/78 |
| 5,357,238 | 10/1994 | Terada | 340/425.5 |
| 5,363,085 | 11/1994 | Terada | 340/425.5 |

OTHER PUBLICATIONS

HT Stroboscopes, Hasler–Tel Co., Inc. Stuart, Florida, p. 12, 1992 Catalog.

Primary Examiner—John K. Peng
Assistant Examiner—Albert K. Wong
Attorney, Agent, or Firm—Robert R. Reed

[57] ABSTRACT

The lighting device and method of this invention makes the wheel well areas of a vehicle available for displaying messages and graphical indicia. The lighting device also allows the wheel well to be illuminated during normal and emergency repairs when insufficient light is available. The lighting device further enhances the appearance of the vehicle and will attract the attention of others. The lighting device can have a sensor to monitor the rotation of the tire and has a pulse modulator to synchronize light flashes from a flash generator with information a sidewall of the tire. The tire will appear to be stopped. A stroboscopic flash tube is used to provide bright flashes of light for a short duration to illuminate the wheel well including the tire. A number of different indicia can be displayed on each tire by modulating the frequency and the phase angle of the light flashes.

16 Claims, 6 Drawing Sheets

STROBE LIGHT FOR A VEHICLE TIRE AND WHEEL

BACKGROUND OF THE INVENTION

This invention relates to an accessory device for vehicles, and more particularly to a lighting device to illuminate the tire and wheel area of a vehicle. In particular, the lighting device can be used to make the tire appear to be stopped as it rotates or can provide emergency lighting of the wheel area when required. Any information on the side of the tire can be communicated as the tire rotates.

The use of vehicles for displaying any messages and advertising products for sale has existed for some time in the art. The large number of vehicles and their exposure to the public provides an excellent source for such messages an advertising. The message can be displayed in any convenient location on the vehicle with the most commonly used locations being the side doors as well as the front and rear bumpers. A person can purchase a variety of messages printed on a plastic sheet with an adhesive back to attach the sheet to a bumper. Signs are also available with magnets to temporary attach the sign to a side door of the vehicle. Stickers on the windows of vehicles are also used to provide identification and to display various types of information. Essentially every convenient location on vehicles is used in some way for written information as well as graphical displays. Signs are also added to the top of the vehicle which are illuminated to display a message on the sign to others, especially at night.

Some locations are more convenient than others depending on the type of information and the movement of the vehicle. For example, the side of a tire is used for messages for the slow moving or stationary vehicle. Normally tires have a black tread and sidewall and many tires have white letters displayed on their sidewalls to advertise the tire manufacturer. The demand for raised white letters on the sidewall of the tire has become greater as owners have become more interested in making a statement by displaying information on the side of their tires. In U.S. Pat. No. 4,318,436 molded rubber articles are disclosed for use on tire sidewalls to provide a combination of decorative, multi-colored, personalized, safety-enhancing and utilitarian type information. The rubber articles provide limitless styling for the vehicle which is stopped or near stopped. However, this location becomes unavailable for the traveling vehicle due to the tire rotating during travel by the vehicle.

The sidewall of a tire can be used to display written and graphical indicia if the tire can be made to appear stationary while the vehicle is moving. Stroboscopic instruments are common in the industry for making moving bodies intermittently visible by illuminating a part of the body with bright flashes of light. Short flashes of very bright light can make a portion of an object appear stationary, if the frequency of the flashes is synchronized to the movement of the object. For example, stroboscopes manufactured by Hasler-Tel Company Inc. of Stuart, Fla. are battery operated and have a range of operation from about 50 to about 30,000 flashes per minute. A short flash duration is also required to keep the indicia from appearing to have blurred image. Flash durations of 50 microseconds are common in the industry. However, stroboscopes in the industry are normally used for inspections of rotating machinery and are usually hand carried or tripod mounted. Stroboscopes in the art are not designed for displaying information on the side of a rotating tire.

Critical to displaying information on the side of a tire is the accurate illumination of the spot on the tire where the information is located. Sensors that can both respond to the frequency of the rotation of the tire and give a signal corresponding to the same exact location each revolution of the tire is required. A magnet and the use of magnetic field responsive switches, preferably the Hall-effects sensor switch, can achieve both of these functions without a direct electrical connection between the magnet and the sensor switch. An application of this type of sensor was disclosed in U.S. Pat. No. 4,241,337 to signal the relative position of two doors. Each application of the Hall-effects sensor switch is unique to the application and device it is to be used with.

General lighting of vehicles and the area around a vehicle for aesthetic effects, and to attract the attention of others to an operator's vehicle, has become something that has considerable economic value in the industry. People like to show off their vehicles. Some of the most recent inventions include lights around the license plate that sequentially operate to produce a light traveling around the plate, lights that illuminate the roadway directly under the vehicle, lights inside the front grill, lighted antennas and the like. These lighting devices have very little utility except for their aesthetic appearance. Care must be exercised in lighting the vehicle to not create a safety hazard by excessive projection of the light from its source.

The reflection of light from a automobile tire is disclosed in U.S. Pat. No. 4,289,376. This patent discloses using an adjustable light reflector attached to the valve of the tire. The light protrudes just outside the outermost edge of the tire's sidewall so as to reflect light once each rotation of the wheel creating a flickering effect. The reflector is illuminated by the lights of other vehicles and information is not displayed on the reflector.

The need continues to exist to provide a means to use the sidewall of a tire to display various types of information. If the sidewall of the tire can be made to appear stationary it presents an excellent location for indicia on the vehicle. A continuing need also exists to find other marketable means to illuminate the vehicle to attract attention. This need can be made more useful if the device can be made to have a utilitarian value.

Accordingly, an object of the present invention is to provide a means for displaying indicia, including written and graphical information, on the side of a tire as the vehicle is moving. In particular, the indicia is made to appear stationary as the tire rotates by illuminating the tire with bright flashes of light.

Another object of the present invention is to install a stroboscopic light and sensor on a vehicle to illuminate a wheel well and a side of at least one tire of a wheel. The light and sensor is to operate using the DC power of the vehicle to provide the illumination.

Yet another object of the present invention is to stroboscopically light the sidewall of a tire of a vehicle in either a constant frequency mode for near-stopped or stopped vehicles and in a synchronized mode for the moving vehicle. The light is to make the rotating tire of the moving vehicle appear to be stopped.

A further object of the lighting device of this invention is to give it more utility by providing an alternate mode of operation to light the wheel well area of a vehicle during repair tasks being performed on the vehicle wheel. This object is to improve the health and safety of the repair person.

SUMMARY OF THE INVENTION

The above objectives are accomplished according to the present invention by a lighting device as disclosed herein. A stroboscopic flash tube with its operational components is placed in a light fixed to the vehicle to illuminate the tire with brilliant light flashes synchronized with the tire's rotational frequency to make the tire appear to be stationary. The direct current (DC) power supply of the vehicles can be used to energize the lighting device. Indicia on the tire can be observed as the vehicle is moving. A further use of the light is to illuminate the wheel and the wheel well at a constant flash frequency for making repairs on the wheel and the tire. A further embodiment allows the wheel well and wheel with its tire to be illuminated with light flashes of constant frequency when the rotational frequency of the tire is slowed to become substantially zero.

In particular, the invention is a lighting device for a vehicle having at least one wheel and a direct current (DC) power supply. The wheel is located within a wheel well of the vehicle and has a rotating portion including a tire and a non-rotating portion including a hub. The tire is in rolling contact with a roadway when in use to propel the vehicle and is removable for making repairs to the tire and the wheel. The lighting device comprises a light attached to the vehicle and having a stroboscopic flash tube to illuminate the wheel of the vehicle. The lighting device further comprises a pulse modulator energized by the DC power supply when activated by a first power switch for monitoring a first electrical signal and for generating a second electrical pulse signal at a modulated frequency and a modulated phase angle. A flash generator is energized and activated by the second electrical pulse signal which triggers said flash tube at the modulated frequency and the modulated phase angle. The wheel is illuminated by the lighting device at the modulated frequency.

A further embodiment of the lighting device of this invention includes a sensor mounted on the wheel. The sensor is energized by the DC power supply when activated by a second power switch for monitoring a rotational frequency of the tire of the rotating portion of the wheel and for generating the first electrical signal corresponding to the rotational frequency. In an additional embodiment a first control switch of the pulse modulator has a plurality of settings to establish a synchronous second electrical pulse signal being a predetermined multiple of the rotational frequency of the tire. A second control switch of the pulse modulator has a plurality of settings to establish the modulated phase angle.

In another embodiment of the invention the pulse modulator further includes a control generator having an oscillator for generating the first electrical signal and producing a constant electrical pulse signal having a modulated frequency value of at least 5 pulses per second. The light illuminates the wheel well including the wheel and one of either with the tire or without the tire.

In a further embodiment components of the vehicle along with the lighting device components form a lighting assembly. The lighting assembly is for a wheel well of a vehicle having a tire. The assembly comprises a sensor for monitoring a rotational frequency of the tire and generating a first electrical signal corresponding to the rotational frequency of the tire. A pulse modulator is for monitoring the first electrical signal to generating a second synchronous electrical pulse signal at a modulated frequency and a modulated phase angle. A direct current (DC) power source energizes the pulse modulator using a first power switch and energizes the sensor using a second power switch. The assembly further comprises a flash generator energized and activated by the synchronous second electrical pulse signal. A light attached to the vehicle has a stroboscopic flash tube which is energized and activated by the flash generator having a power trigger to produce light flashes at the modulated frequency and the modulated phase angle. The light flashes thereby illuminate the wheel well having the tire of the vehicle.

In yet another embodiment a method for stroboscopically lighting at least one wheel well of a vehicle is provided by this invention. The vehicle has a direct current (DC) power supply and each respective wheel well has a removable tire. The method has a first step of attaching a light having a stroboscopic flash tube to the vehicle at a location adjacent the wheel well including the tire. A second step includes sensing a rotational frequency of the tire using a sensor mounted on a wheel of the vehicle energized by the DC power supply and activated by a second power switch to generate a first electrical signal. A third step includes providing a pulse modulator energized by the DC power supply and activated by a first power switch to receive and monitor the first electrical signal from the sensor. A fourth step includes modulating the first electrical signal using the pulse modulator to generate a second electrical pulse signal at a predetermined modulated phase angle based on the circumferential location of indicia on a sidewall of the tire. The next fifth step includes modulating the first electrical signal using the pulse modulator to generate the second electrical pulse signal at a predetermined modulated frequency based on the indicia equally positioned in an angular relationship around the sidewall of the tire. A final sixth step includes operating the first and second power switches to provide stroboscopic lighting of the wheel well and the tire.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail. The lighting device of this invention has numerous structural components that allows the rotational frequency of a vehicle tire to be substantially eliminated while displaying written and graphical indicia on the sidewall of a tire. The lighting device further allows the wheel well of the vehicle to be illuminated when the vehicle is stopped for repairs (i.e. to remove a flat tire), and when the vehicle is essentially stopped. The essential components include a vehicle power supply, a pulse modulator, a flash generator and a stroboscopic flash tube. A rotation sensor is also essential for displaying indicia on the rotating tire. These components act in combination to achieve the objectives of the invention as outlined and further detailed in the following description.

Figure 1:
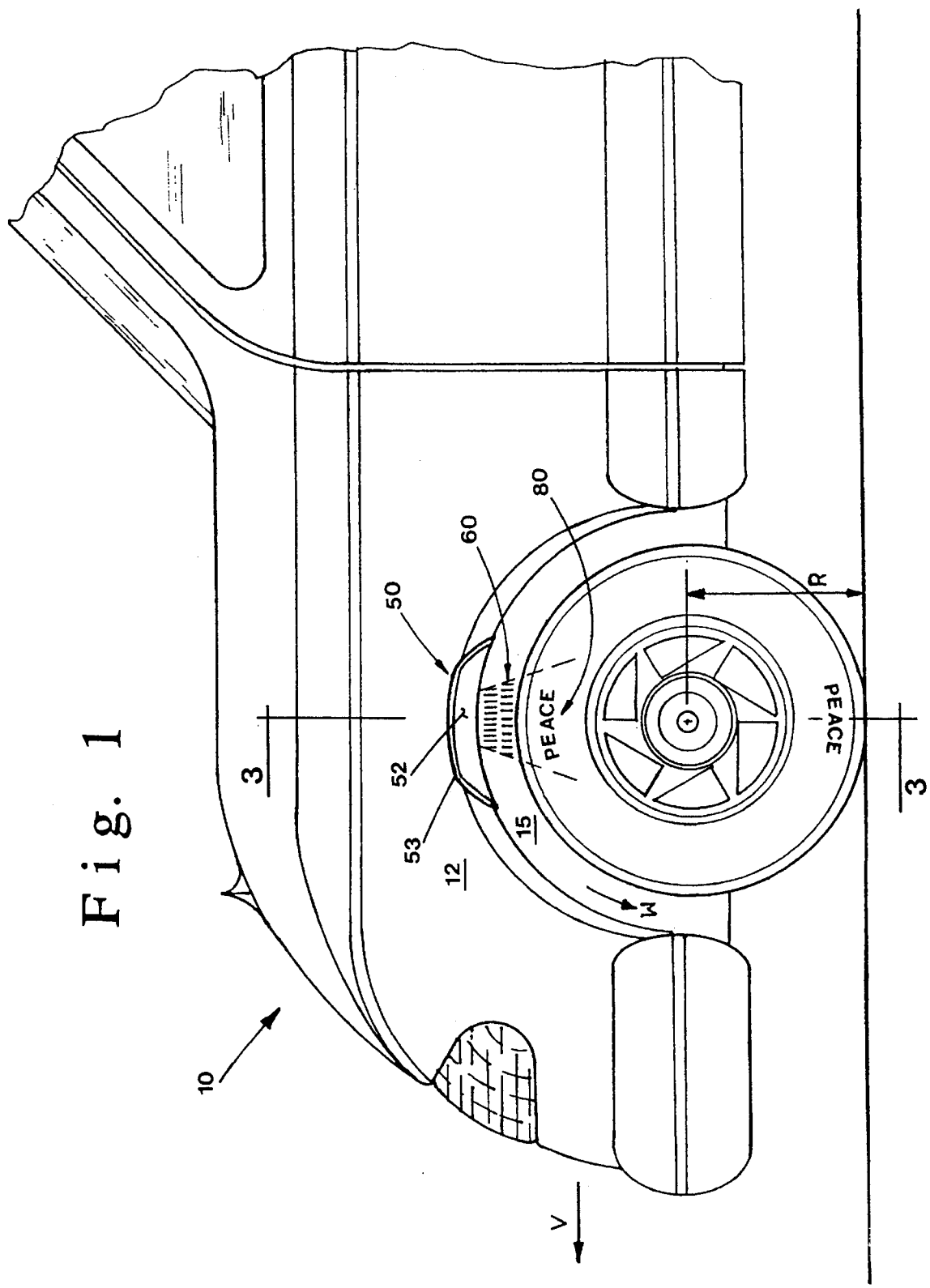
FIG. 1 is a side elevation view of a vehicle having the light of this invention installed thereon.

A lighting device having a light 50 installed on the front quarter panel 12 of a vehicle 10 is illustrated in FIG. 1. The light 50 is installed to illuminate a wheel well 15 having tire 70. The tire is preferably illuminated at an area on the top portion of the tire. Other locations around the tire can also be chosen within the scope of this invention. For example, a frontal location can be illuminated with the light located near the rear portion of a front bumper. The preferred location is as illustrated in FIG. 1, so that indicia 80 (PEACE) can be read in a normal horizontal orientation. The tire 70 is in rolling contact with a roadway 90 and makes F revolutions every minute depending on the speed V of the vehicle. The relationship between the vehicular speed and rotational frequency is;

$$F=(44 \times V)/(\pi \times R)$$

where $\pi$ is the mathematical constant pi, R is the rolling radius of the tire in feet, V is the vehicle speed in miles per hour and F is the rotational frequency in revolutions per minute. For example, a passenger car going 30 miles per hour (MPH) on a 205/75 R15 size tire (R=1.12 ft.) has a rotational frequency of 372 revolutions per minute, or 6.2 revolutions every second. The indicia 80 will be at the top of the tire F=372 times every minute.

If the speed of the vehicle doubles to 60 MPH the tire rotates at 744 revolution per minute. Similarly, if there are two locations on the tire having the indicia PEACE, and the vehicle is traveling at 30 MPH, the indicia passes the top of the tire 744 times per minute. The purpose of the light 50 is to provide light flashes 60 synchronized with the indicia 80 each time it is positioned under the light at the top of the tire 70. With light flashes having a short time duration the indicia can be made to look as if it is stationary on the side of the rotating tire. The frequency values resulting from a rotating tire are well within the operational capability of a light having a stroboscopic flash tube.

Various components are required to provide the flashes of light to properly illuminate the wheel well according to the invention including the wheel of the vehicle. The essential components of the lighting device of this invention provide these light flashes. Components are to be interconnected as illustrated in the flow diagram of FIG. 2. A rotation sensor 20 having a synchronized pickup monitors the rotational frequency of a rotating portion of the wheel including the tire 70. The sensor is energized by a power supply by closing a second power switch S2. The normal power supply for vehicles is a 12 volt direct current (DC) power supply, which is the preferred DC power supply 31 for the lighting device of this invention. The DC power supply 31 is best provided by the battery and/or alternator of the vehicle 10 during normal operation of the vehicle. The use of a transformer rectified alternating current (AC) source to achieve the DC power supply is also within the scope of this invention. The first and second power switches S1 and S2 are located to be accessible by the vehicle operation during normal driving of the vehicle. Switches standard in the industry are used.

The sensor can provide a first electrical signal 32 that is an input to a pulse modulator 41 having a control generator. In sampling by the rotation sensor 20, the rate of information transmitted is limited by the rate at which the signal is sampled. That is, a discrete number of voltage and current values are transmitted to the pulse modulator 41 per unit of time. The synchronized pickup of the preferred rotation sensor 20 is a Hall-effects sensor device. A Hall-effects sensor device has two components being: (1) a switch means operatively responsive to a magnetic field; and (2) a magnet means. The switch means, being a sensor switch, responds to the field emanating from the magnet means, being a magnetized tooth, to generate a first electrical signal 32 (FIG. 2) representative of the relative position of the two components.

Sensor switches can be monopolar or bipolar. Hall-effect sensor switches of both types are well known in the industry. A monopole sensor is preferred for the lighting device of this invention. A monopole sensor is one in which a first switch state corresponding to an "ON" logic state is achieved only when the monopolar Hall-effect sensor is in the presence of a south magnetic field. The monopole sensor reverts to the "OFF" state whenever the south field is removed. With this type sensor a simple magnetized tooth can be used as the magnet means on a rotating portion of the wheel with the south pole of the tooth facing the sensor switch placed on a non-rotating portion of the wheel. Each time the tooth passes the sensor switch a first electrical signal is generated. The result is a train of pulses representing the frequency and phase angle of the two components with respect to one another.

An alternate means of providing a first electrical signal to represent the frequency and phase angle of the rotating portion of the wheel is by using a encoder device. These devices are known in the industry to accurately measure the number of revolutions and parts of a revolution between a rotating portion and a corresponding non-rotating portion of adjacent mechanical structures. The preferred sensor of this invention is the Hall-effects sensor.

The pulse modulator 41 is also energized by the 12 volt DC power supply 31 and is activated by a first power switch S1. The pulse modulator has many functions which are necessary to discussed in detail. The pulse modulator has either one of two possible outputs to provide a second electrical pulse signal 34 or pulse signal 36, depending on the desired mode of operation of the lighting device and the speed of the vehicle, as set by a control generator of the pulse modulator. A synchronous second pulse signal 34, having a modulated frequency and a modulated phase angle which are synchronized with the rotational frequency of the tire, is in control when the vehicle is moving at a speed that yields a rotational frequency of the tire of at least sixty (60) revolutions per minute, being one revolution per second. A constant second electrical pulse signal 36, having a modulated frequency based on a carrier frequency which is constant, is in control when the vehicle is moving at a speed that yields a rotational frequency less than about sixty revolutions per minute.

Signal shaping techniques are directly applicable to pulse modulation techniques. The first electrical signal 32 in the form of electrical voltages and currents must be shaped or modulated by the pulse modulator 41, including the control generator and its oscillator component. Inter-modulation or modulation distortion is when only a single pickup (sensor) signal is involved and its characteristics are altered as a function of itself. Intermodulation exists for the lighting device of this invention. The electrical output of the pulse modulator is provided by the control generator of the pulse modulator. These distortion functions exist for this invention, as both the frequency and the phase angle of the first electrical signal are modulated and controlled to produce either one of a second electrical pulse signal 34 or pulse signal 36. Electrical controls of the control generator help provide for constant, synchronous and multiple synchronous operation of the lighting device of this invention.

Figure 2:
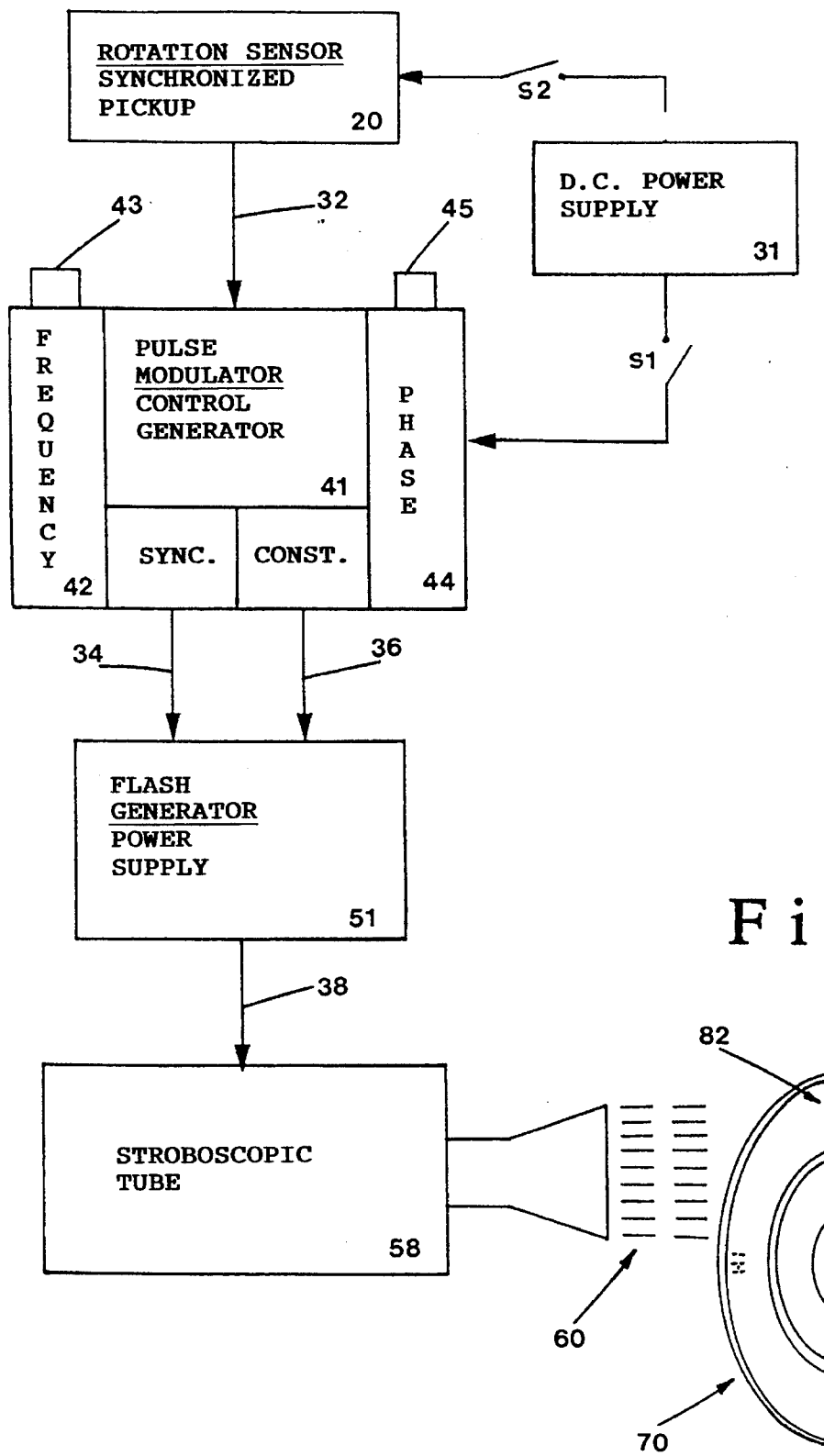
FIG. 2 is a flow diagram of the interconnected components of the invention producing light flashes on the side of a tire.

Phase angle modulation is critical for the preferred operation of the lighting device of this invention. The phase angle of the first electrical signal 32 from the rotation sensor 20 is controlled by a phase modulator 44 within the pulse modulator 41, as illustrated in FIG. 2. It is necessary to modulate the timing of the first electrical signals to coordinated the pulsed light flashes 60 with the indicia 82 being displayed on the tire. The rotation sensor being in a reference position to give a first electrical signal may have an angular offset distance from the indicia on the tire, when the tire is mounted on a rim of the wheel. Mounting of the tire can be coordinated with the angular position of the rotation sensor on the vehicle's wheel. However, to achieve the best tire balance, an angular offset between the reference position and the indicia position is likely to occur. A second electrical control switch 45, being a component of the control generator's function, provides the required coordination of the pulsed light flashes 60 to be correctly positioned for viewing the indicia 82 on the tire. The preferred viewing position is when the indicia is at the top of the tire during the tire's rotation.

Frequency modulation is also critical to the preferred operation of the lighting device. A frequency modulator 42, being another component of the pulse modulator 41, can be controlled to function in various modes depending on control generator settings of a first control switch 43. The operational modes of the lighting device of this invention include:

1) The generation of light flashes of a predetermined constant frequency controlled independent of the kinematic state of the rotating portion of the wheel 72 including the tire 70;

2) The generation of synchronous light flashes depending on the rotational frequency and phase angle of the rotating portion of the wheel of the vehicle; and 3) The generation of synchronous light flashes depending on multiples of the rotational frequency of the rotating portion of the wheel and a single phase setting for the rotating tire on the vehicle.

In the first mode a first voltage and current is produced by the control generator having a non-synchronous or carrier frequency oscillator for generating electrical oscillations. These oscillations are modulated to become constant second electrical pulse signals 36 at a predetermined modulated frequency to energize and activate the flash generator 51. This first mode is used for both the vehicle with a velocity which is substantially zero and for a constant pulse frequency illumination of the wheel well including the wheel. This mode will also exist when the second power switch S2 for energizing the sensor is not activated and the first power switch S1 is activated; as there is no first electrical signal 32 being provided to the pulse modulator from the sensor. The phase angle for the first mode is not important and can be any convenient value.

Once again, the constant pulse frequency is provided by the oscillator being a part of the control generator of the pulse modulator. The constant pulse frequency can be set at any convenient pulse rate to illuminate the tire and wheel. The preferred constant pulse frequency is selected to be about two (2) pulses per second, being 120 pulses per minute.

In the second mode, a second electrical voltage and current signal is produced in a synchronous portion of the control generator under the influence of electrical voltages and currents from the first electrical signals 32 generated by the rotation sensor 20. The synchronous second voltage and current become the synchronous second electrical pulse signals 34 to energize and activate the flash generator 51. In the third mode, a third voltage and current is produced using the carrier frequency oscillator to divide the rotational frequency inherent in the first electrical signal 32 into multiples of the rotational frequency of the rotating portion of the wheel including the tire. Frequency multiplication of the constant frequency oscillator is achieved by passing the oscillator output through harmonic amplifiers to multiply the frequency.

The output of the pulse modulator 41, being either the synchronous second electrical pulse signal 34 or the constant second electrical pulse signal 36, energizes and activates the flash generator 51. Electrical pulses controlled by the flash generator 51 should have the shape of sharp spikes of electrical voltage. The flash generator is associated with a power trigger that provides the correct voltage, current and pulse duration for the pulsed electrical trigger signal 38 supplied to a stroboscopic flash tube 58. Alternately, the flash tube may provide its own trigger within the scope of this invention. Power triggers have a storage device and a peaking transformer connected in series with the flash tube components to generate a high voltage low current pulse of electrical energy to fire the flash tube.

The requirements for a pulsed light source 60 are numerous. The spectral distribution of the radiated power should correspond to the spectral distribution of the sensitivity of the viewer's eye as much as possible. Depending on the conditions under which the image is observed, the light source should be capable of generating an appropriate light output intensity. In addition, depending on the given minimum blur and the required image viewing frequency, the pulsed light source should have an electrical luminous inertia small enough for it to be able to generate short intense light flashes 60. Finally, the source of pulsed light should be durable enough to provide a pulsed flash output consistent with the total lifetime hours of operation required. The components and operation of the lighting device of this invention herein specified meet these requirements.

The flash tube itself may act as a trigger in present day stroboscopic flash tubes. Gas-filled tubes work with an electrical discharge taking place in a gas filled inter-electrode space. Stroboscopic flash tubes are cold-cathode, gas-filled, arc-discharge tubes having one or more external grids to initiate current flow and produce intensely bright flashes of light. Flash tubes function as electroluminescent lamps when activated by the electrical discharge. The most common flash tubes within the scope of this invention are filled with inert gases such as neon, argon, krypton, xenon and the like. Electroluminescent radiation sources have low energetical radiative efficiency of source and a high energetical light luminous efficiency. The two essential properties of stroboscopic gas-filled flash tubes are: (1) the emissions of radiant energy; and (2) a discharge being initiated by an electrical voltage spike across the proper electrodes. Because of the second property a gas-filled flash tube can function as a flash trigger. The preferred stroboscopic flash tube 58 of this invention functions as a flash trigger.

Stroboscopic instruments are common in the industry for making moving bodies intermittently visible by illuminating the an object with these bright flashes of light. Stroboscopic flash tubes 58 can produce several hundred thousand candle power with a duration of only a few millionths of a second. This makes the stroboscopic flash tube essential for the light flashes 60 required for the lighting device of this invention. A typical example is the stroboscopes distributed by Hasler-Tel Company, Inc. of Stuart, Fla. as previously disclosed in the background. Information on model HT4250 is included herein by making reference thereto. This hand held stroboscope has a 12 volt DC power supply with a switch and its pulse modulator includes provisions for a phase shift, a multiply or divide frequency rate, a mode selector and a pulse rate control. The unit further includes an external trigger and synchronous output port and a display. The operation characteristics of this model HT4250 include a range of 54 to 33,000 flashes per minute at a illumination power rating of 10,000,000 candelas and a flash duration of 30 microseconds. The flash tube is filled with a xenon gas and is rated a 10 watts maximum. These physical parameters are well within the requirements for the lighting device of this invention.

Technical specifications and physical requirements of the components as well as operational characteristics of the lighting device of this invention having been disclosed above, attention is given once again to the general installation, structure and functions of the lighting device. Of critical importance is the preferred location of components as they physically relate to the vehicle 10.

Figures 3A, 3B:
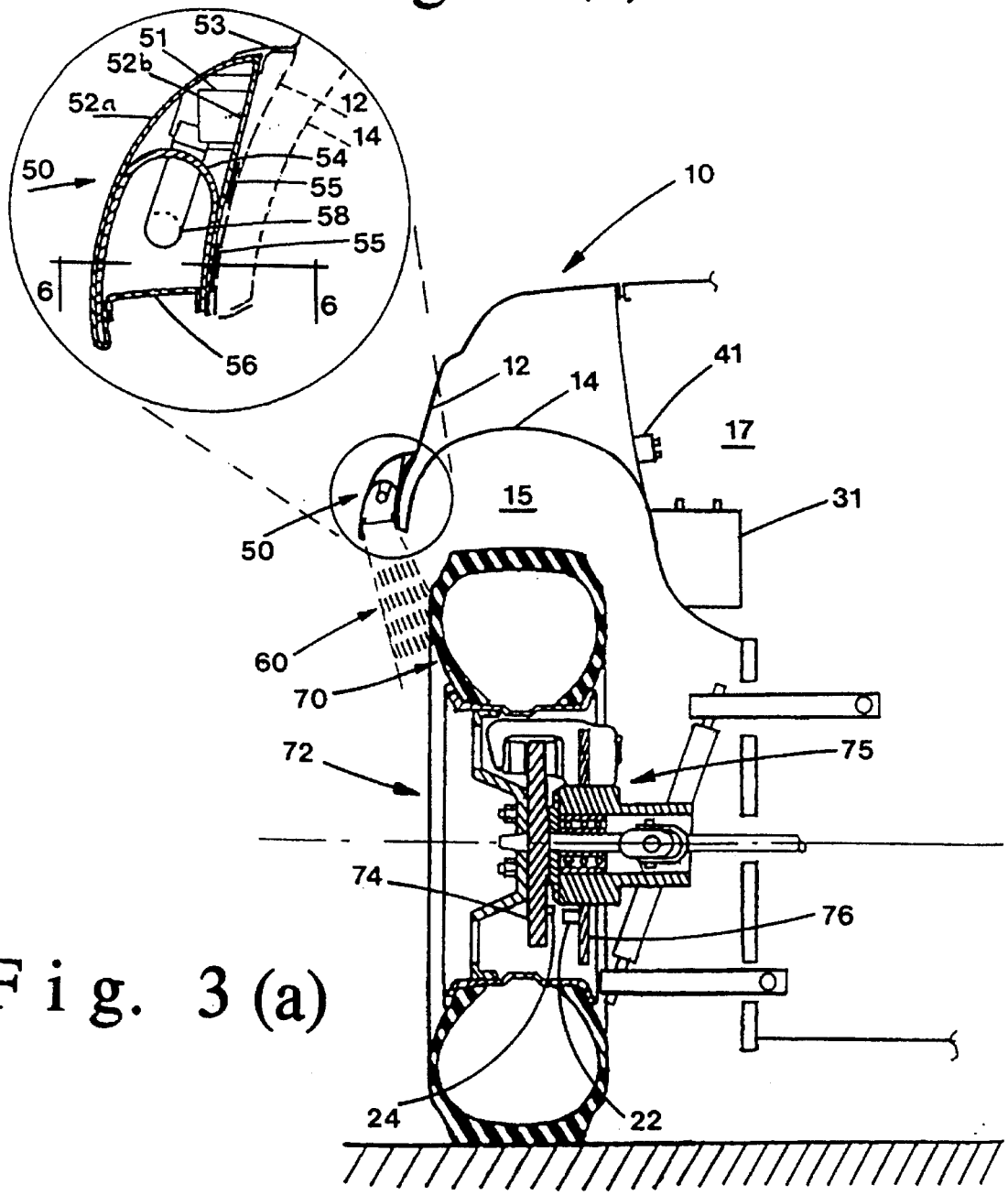
FIG. 3 is a cross-sectional view of a tire and wheel of the vehicle having the lighting device of this invention thereon and taken along line 3—3 in FIG. 1.
Figure 4:
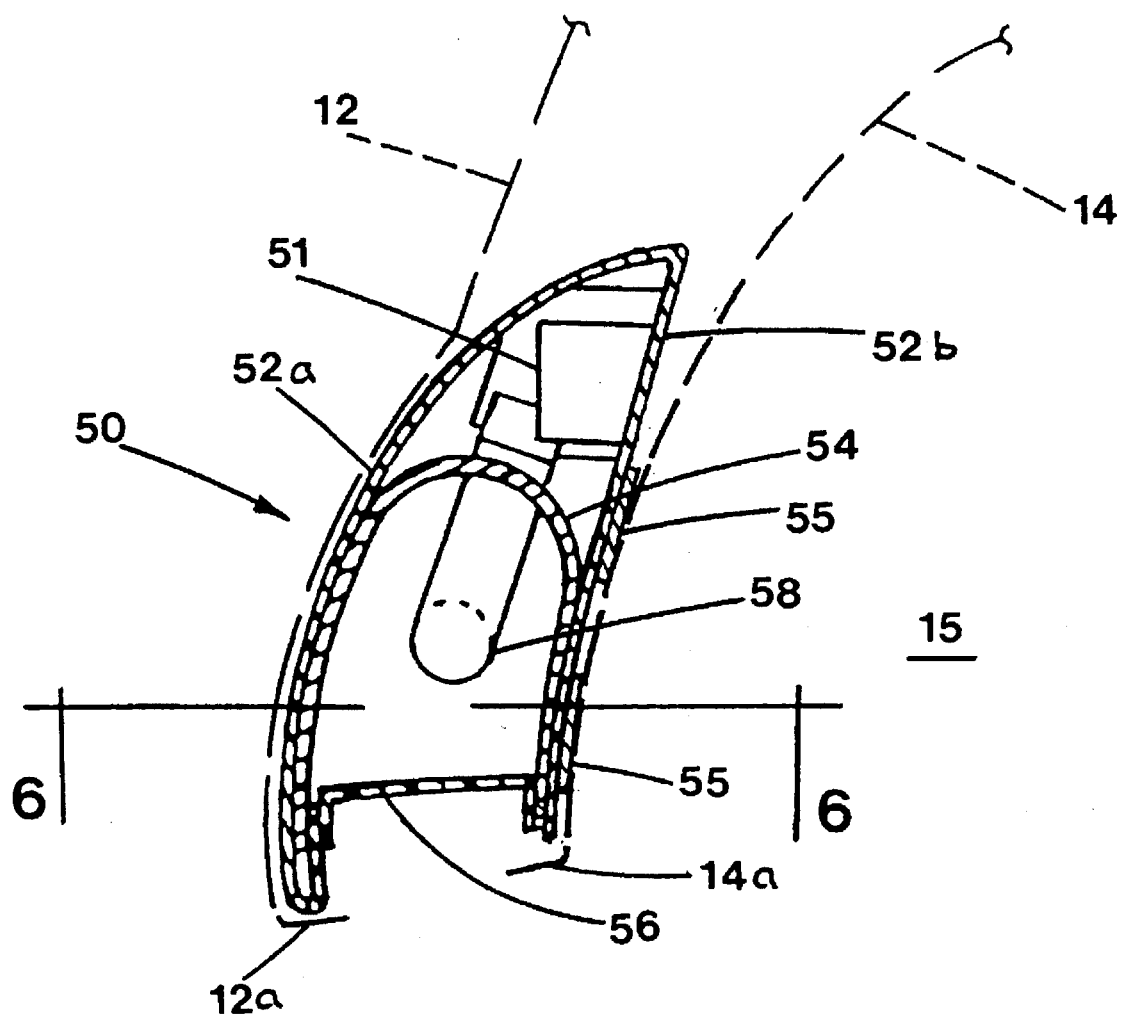
FIG. 4 is a cross-sectional view of the light of this invention installed within a wheel well of the vehicle.

The lighting device can be used as an aftermarket device or it can be designed as a part of the original or optional equipment for the new vehicle. The illustrations of FIGS. 3 and 4 show the components of the lighting device in relation to a cross-section taken along line 3—3 in FIG. 1. The light 50 is placed on a quarter panel 12 of the vehicle as shown in the enlarged cross-sectional view of FIG. 3. Adhesive attachment strips 55 are preferably used to rigidly attach the light to the quarter panel. Other attachment means may be used to rigidly attach the light to the quarter panel, or the lighting device may be attached by the original manufacturer of the vehicle.

The stroboscopic flash tube 58 is contained within an enclosure having an exterior enclosure wall 52a and an interior enclosure wall 52b. A closure strip 53 is provided to allow one size of light to fit on quarter panels of vehicles having various size and shape. A reflector 58 is positioned around the flash tube to project the light flashes 60 to the tire 70 and the wheel 72 within a wheel well area 15 of the vehicle. The direction of the projected light flashes is critical for providing a lighting device that is not a distraction to the flow of traffic on the roadway. A clear lens 56 protects the flash tube from damage by roadway debris. The preferred location of the flash generator 51 is within the enclosure walls 52a and 52b.

A pulse modulator 41 is preferably placed within an engine compartment 17 to be adjacent to a DC power supply 31. The pulse modulator 41 can be placed inside the vehicle to be accessible by the vehicle operator in setting the first control switch 43 and the second control switch 45 (FIG. 2). However, once the switches are set for displaying a particular indicia, the settings should remain until another indicia is chosen.

The rotation sensor with its two Hall-effects sensor means must be installed to provide the rotational frequency of the tire and wheel. FIG. 3 shows the standard components of a vehicle wheel 72 inside the wheel well 15 of the vehicle. The sensor has a magnet means placed on a rotating portion of the wheel including a tire 70 and a switch means placed on the non-rotating portion of the wheel including a hub 75. The preferred placement of the magnet means, being a magnetized tooth 24, is at a location on the brake disk 74 radially inside the breaking surface. The preferred placement of the switch means, being a sensor switch 22, is on a backing plate 76 of the hub. Any convenient location may be used for these two sensor means within two restrictions. First, the magnetized tooth must be on a rotating portion including the tire 70. Secondly, the sensor switch must be on a non-rotating portion including the hub 75. The hub does not rotate but must be able to move up and down with the wheel while maintaining a fixed distance from the rotating portion of the wheel. No electrical lead wires are required between the tooth 24 and the sensor switch 22.

The lighting device may be used to illuminate the wheel well area 15 when repair work is needed within this area of the vehicle. The first mode of operating the lighting device can provide light flashes of a constant frequency sufficient to provide illumination for the wheel well. This is particularly useful when removing a flat tire at night and/or during repair tasks on the wheel assembly when natural lighting is not adequate. The same constant frequency as used in normal first mode of the lighting device can provide this added functional feature of the lighting device and method of this invention.

An alternate location of the lighting device on the vehicle is illustrated in FIG. 4. In this location the lighting device has been placed between the quarter panel 12 and the wheel well panel 14 of the vehicle. This location provides a location where the light 50 is concealed and provides better outside clearance for the vehicle. However, the ability to light the sidewall of the tire is more limited. The preferred installation depends on the relative location of the tire with respect to the outer limits of the quarter panel of the vehicle. The closure strip may be eliminated with this alternate location.

Figure 6:
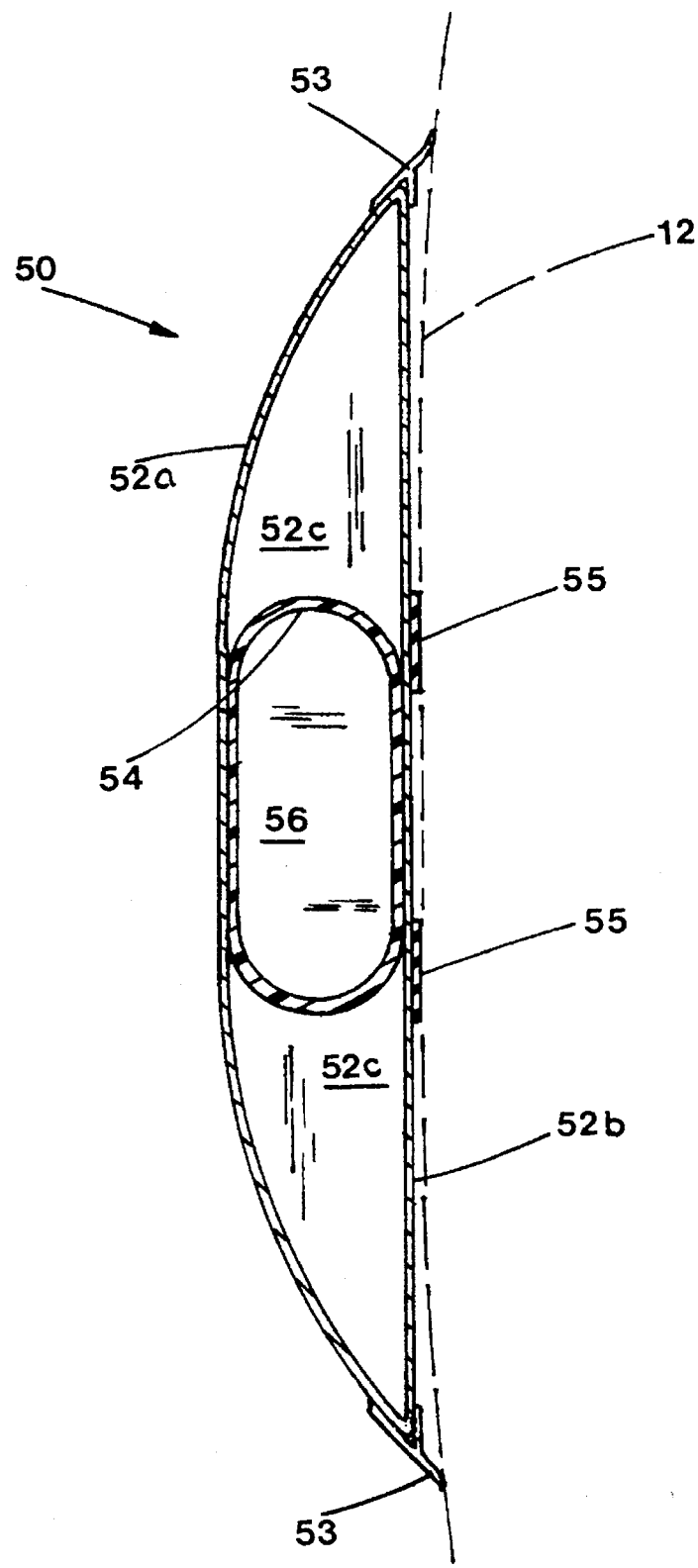
FIG. 6 is a cross-sectional view of the light of this invention taken along line 6—6 in FIG. 3 or FIG. 4.

The shape of the light may taper toward the front and also toward the rear of the vehicle, as illustrated in FIG. 6. This contour will assist the light in conforming to a shape consistent with a curvilinear quarter panel 12a of the vehicle. The closure strip 53 may extend to the front and the rear to help conform to curvilinear quarter panels of various shape. Bottom enclosure walls 52c are provided to keep debris from entering the enclosure of the light. The light 50 may be made of any one or a combination of suitable materials including steel, aluminum, plastic, rubber, fiber reinforced resin or glass. Electrical components are to be made of standard materials used in the electronics industry.

The various components of the lighting device, as illustrated in FIG. 3, are attached to the vehicle and interconnected within the vehicle by electrical lead wires (not shown). Lead wires extend from the DC power supply 31 to both the sensor switch 22 and the pulse modulator 41. The output of the sensor switch 22 is electrically transmitted by lead wires to the pulse modulator 41. Lead wires extend further from the pulse modulator to the flash generator 51 and stroboscopic flash tube 58 within the light 50 attached to the quarter panel 12 of the vehicle. Standard electrical lead wire gage sizes can be used consistent with about 10 watts used by the lighting device. Particular care must be used in locating and attaching wires to move with the hub 75 as it is displaced with respect to the wheel well 15.

Figure 5A:
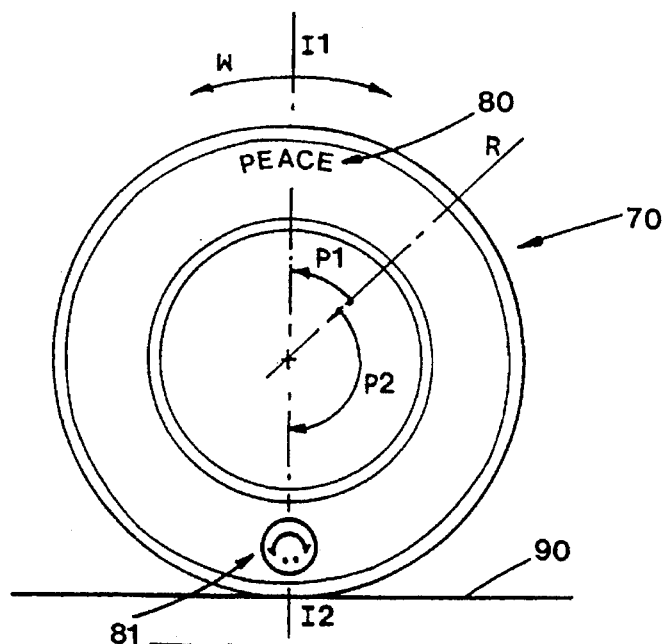
FIGS. 5a, 5b and 5c are side elevations of a tire showing various indicia that can be displayed by the lighting device of this invention.

The operational modes of the lighting device allow indicia to be displayed at different locations on the sidewall of the tire. The sidewall of FIG. 5a shows two different indicia, one indicia 80 being the word "PEACE" and the other indicia 81 being a graphical "happy face". The rotation sensor is positioned along the radial reference line R on the wheel of the vehicle. To display the word PEACE, a counterclockwise phase angle P1 to line I1 from the reference line R is required. This phase angle is set by the second control switch 45 of the pulse modulator (FIG. 2). As the tire rotates, the output from the rotation sensor 20 is modulated by setting the first switch 43 to effectively cause the light flashes to be synchronized with the word PEACE each time the tire is at the position shown in FIG. 5a. Alternately, the happy face indicia can be illuminated each revolution of the tire by setting the second control switch 45 to achieve a clockwise phase angle P2 to line I2, as shown in FIG. 5a. Any reasonable number of different indicia on the one tire can be illuminated and displayed one at a time by using different phase angles to correspond with their angular location relative to the reference line R of the sensor location.

The same indicia 82 can be displayed a number of times in one rotation of the tire by selecting the multiple frequency mode three of the lighting device. This mode is also selected by the first control switch 43. The word "HI" is illustrated on a tire, having an angular velocity of W1, in FIG. 5b to be displayed 4 times around the tire 70. The four indicia HI are displayed an equal angular distance around the tire from one another and one is located at a phase angle P3 to line I3 from the reference line R. The second control switch 45 is set to modulate in angle this one indicia HI be at the top of the tire when a light flash occurs. The first control switch 43 is set to modulate the light flashes in frequency to give a multiple of four times the rotational frequency from the tire. This multiple placement of indicia will result in a more frequent display of HI to make it appear to have substantially a constant illumination, even when the vehicle is moving slowly.

Figure 5B:
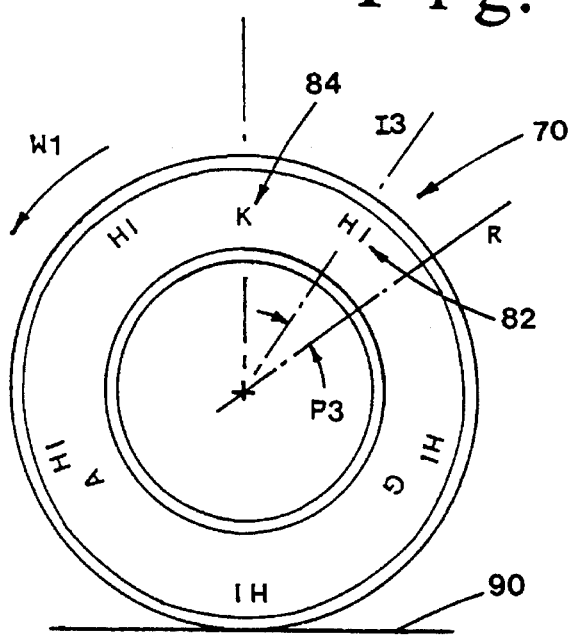

A second set of indicia 84 can also be incorporated on the same tire illustrated in FIG. 5b. This indicia represents a persons' initials, being "KGA" for example, where each letter is displayed in a different position on the tire. The angular positions are 120 degrees apart to first display a "K" followed by a "G" and finally an "A", which are repeated each revolution of the tire. The multiple frequency mode of operation must be modulated to a third multiple of the first electrical signal 32 from the rotation sensor 20 using the first control switch 43 and a different phase modulation setting using the second control switch 45 (FIG. 2).

Figure 5C:
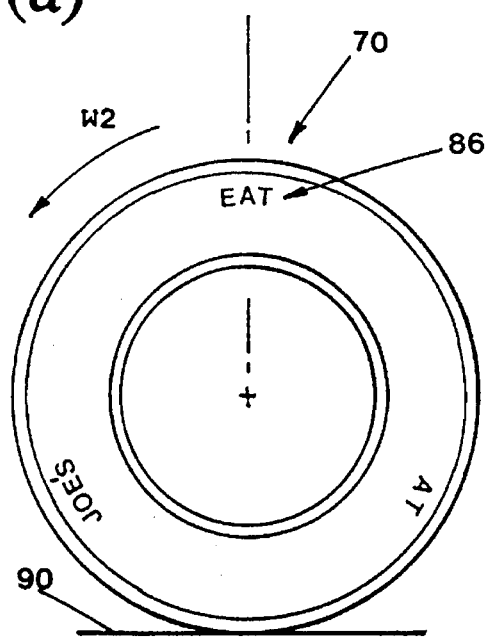

The display of a third indicia 86 being a short phrase "EAT AT JOE'S" is illustrated on a tire with an angular velocity W2 in FIG. 5c. Indicia of this nature are used to advertise a product or a service. The same modulation of the rotational frequency, being three times the rotational frequency of the tire, is required for this phrase. Care must be used to avoid having a phrase displayed which must be read too quickly. The average reading speed of the observer is only about 200 to 300 words per minute. A rotational frequency of the tire of only about 67 to 100 revolutions per minute can be used to display these three words. For example, the effective speed of a vehicle with the third indicia 86 on the sidewall of a 205/75 R15 size tire 70 is only about 5 to 8 miles per hour. This would be effective at an traffic intersection, approaching a stop light, on a semi-stalled freeway and the like.

The display of graphical indicia can be made with multiple images equally positioned around the sidewall of a tire which follow a sequence of moves. For example, the happy face can be made to go from a frown to a smile in one revolution of the tire.

A further consideration in properly displaying indicia is the ability of the lighting device to provide light flashes of short duration. This is essential for making the indicia readable and not blurred. For example, a vehicle traveling about 60 miles per hour has the top of the tire, where the indicia is preferably placed, traveling approximately 160 feet per second. This requires the time of a light flash to be of a very short duration to avoid a blurred image. Flash durations of 50 microseconds or less are possible with the stroboscopic flash lamps specified in this disclosure. In this example, the indicia would move only 0.1 inch in 50 microseconds. Very little blurring is observed with the lighting device of this invention used to display indicia on the sidewall of a rotating tire.

The possibilities for displaying indicia on the side of a rotating tire are limitless. A single wheel or a plurality of wheels can be used to display the same indicia or a variety of indicia, being different on each tire of each wheel. It may be possible to have one pulse modulator for all wheels if only the first mode of operation, being constant second electrical signal, is desired.

While a preferred embodiment of the invention has been described using specific terms, such description is for illustrative purposes only, and it is to be understood that changes and variations may be made without departing from the spirit or scope of the following claims.

What is claimed is:

1. A lighting device for a vehicle having at least one wheel and a direct current (DC) power supply, each wheel being located within a wheel well of said vehicle and having a rotating portion including a tire and a non-rotating portion including a hub, said tire being in rolling contact with a roadway when in use and removable for making repairs to said tire and said wheel, said lighting device comprising:

a light attached to said vehicle and having a stroboscopic flash tube to illuminate said wheel of said vehicle;

a pulse modulator energized by said DC power supply when activated by a first power switch for monitoring a first electrical signal from said rotating wheel and for generating a second electrical pulse signal at a modulated frequency and a modulated phase angle; and a flash generator energized and activated by said second electrical pulse signal for triggering said flash tube at said modulated frequency and said modulated phase angle, wherein said wheel is illuminated by said lighting device at said modulated frequency.

2. The lighting device set forth in claim 1, including a sensor mounted on said wheel, said sensor being energized by said DC power supply and activated by a second power switch for monitoring a rotational frequency of said tire of said rotating portion of said wheel and for generating said first electrical signal corresponding to said rotational frequency.

3. The lighting device set forth in claim 2, including a first control switch of said pulse modulator having a first setting to establish a synchronous second electrical pulse signal having said modulated frequency being a predetermined multiple of said rotational frequency of said tire, wherein said flash tube illuminates at least one indicia on a sidewall of said tire.

4. The lighting device set forth in claim 3, wherein said pulse modulator further includes a control generator to monitor the frequency of the first electrical signal such that when said first electrical signal has a frequency value less than about one pulse per second said second electrical pulse signal is made to have a constant fixed frequency value being at least 2 pulses per second, wherein said light stroboscopically illuminates said tire when said vehicle has a velocity substantially zero.

5. The lighting device set forth in claim 3, wherein said first control switch further has a plurality of second settings such that said second electrical pulse signal has a modulated frequency value which is N times the rotational frequency of said tire, wherein said light stroboscopically illuminates N equally spaced apart locations circumferentially around said sidewall of said tire, wherein N is any whole integer value.

6. The lighting device of claim 2, wherein said sensor includes:

a magnetized tooth attached to said rotating portion of said wheel; and a sensor switch attached to said non-rotating portion of said wheel which is electrically responsive to said magnetized tooth for generating said first electrical signal.

7. The lighting device set forth in claim 1, wherein said pulse modulator further includes a control generator having an oscillator for generating said first electrical signal and producing a constant second electrical pulse signal having a modulated frequency value of at least 5 pulses per second, wherein said light illuminates said wheel well including said wheel.

8. The lighting device set forth in claim 2, including a second control switch of said pulse modulator having a plurality of settings to establish a synchronous second electrical pulse signal having said modulated phase angle, said modulated frequency being a predetermined angle from 0 to 180 degrees clockwise or counterclockwise between a reference line associated with said sensor and an indicia line associated with said indicia on said tire, wherein said flash tube illuminates at least one indicia on a sidewall of said tire.

9. The lighting device set forth in claim 1, wherein said light is rigidly attached to a quarter panel of said vehicle at a predetermined mounting location and positioned to direct light flashes from said flash tube to said wheel of said vehicle.

10. The lighting device set forth in claim 9, wherein there are a plurality of lighting devices with each lighting device illuminating a sidewall of said tire of said wheel to display indicia attached to the sidewall, wherein said indicia appears to be stationary with respect to a moving vehicle.

11. The lighting device set forth in claim 9, wherein said light further includes:

an outer enclosure wall to the exterior of said vehicle;

an inner enclosure wall toward the interior of said vehicle;

said enclosure walls having a configuration to generally conform to a shape of the quarter panel of said vehicle at said mounting location;

a reflector adjacent to said flash tube to project said light flashes from said flash tube;

a lens at a lower portion of said walls to protect said flash tube from damage by debris from said roadway; and a closure strip to make said walls have a smooth contour with said quarter panel of said vehicle.

12. A lighting assembly for a wheel well of a vehicle having a tire, said assembly comprising:

a sensor for monitoring a rotational frequency of said tire and generating a first electrical signal corresponding to said rotational frequency of said tire;

a pulse modulator for modulating said first electrical signal to generate a synchronous second electrical pulse signal at a modulated frequency and a modulated phase angle;

a direct current (DC) power source to energize said pulse modulator using a first power switch and to energize said sensor using a second power switch;

a flash generator energized and activated by said synchronous second electrical pulse signal; and a light attached to said vehicle and having a stroboscopic flash tube which is energized and activated by said flash generator having a power trigger to produce light flashes at said modulated frequency and said modulated phase angle, wherein said light flashes illuminate said wheel well having said tire of said vehicle.

13. The lighting assembly of claim 12, wherein said pulse modulator includes:

a control generator having an oscillator for modulating said first electrical signal to generate said second electrical pulse signal at said modulated frequency; and a first control switch to establish said modulated frequency having a predetermined value based a multiple of said rotational frequency of said tire.

14. The lighting assembly of claim 12, wherein said pulse modulator includes:

a control generator having an oscillator for modulating said first electrical signal to generate said second electrical pulse signal at said modulated phase angle; and a second control switch to establish said modulated frequency having a predetermined value based on the circumferential location to be illuminated on said tire.

15. The lighting assembly of claim 12, wherein the light further includes:

an outer enclosure wall and an interior enclosure wall to enclose said flash tube and provide a structure for mounting said light on a quarter panel of said vehicle; and a reflector adjacent said flash tube to help illuminate said wheel well and said tire and a lens at the lower portion of said walls to protect said flash tube from damage due to debris in said wheel well.

16. A method for stroboscopically lighting at least one wheel well of a vehicle having a direct current (DC) power supply, each wheel well having a tire, said method including for a respective wheel well the steps of;

a) attaching a light having a stroboscopic flash tube to said vehicle adjacent said wheel well and said tire;

b) sensing a rotational frequency of said tire using a sensor mounted on a wheel of said vehicle energized by said DC power supply and activated by a second power switch to generate a first electrical signal;

c) providing a pulse modulator energized by said DC power supply and activated by a first power switch to receive and monitor said first electrical signal from said sensor;

d) modulating said first electrical signal using a second control switch of said pulse modulator to generate a second electrical pulse signal at a predetermined modulated phase angle based on the circumferential location of indicia on a sidewall of said tire;

e) modulating said first electrical signal using a first control switch of said pulse modulator to generate said second electrical pulse signal at a predetermined modulated frequency based on said rotational frequency of said tire and the number of said indicia equally positioned in an angular relationship around said sidewall of said tire; and f) operating said first and second power switches to provide stroboscopic lighting of said wheel well and said tire at said modulated frequency and said modulated phase angle.

* * * * *